(12) United States Patent
Sahu et al.

(10) Patent No.: US 9,340,436 B2
(45) Date of Patent: May 17, 2016

(54) SEA WATER DESALINATION SYSTEM

(71) Applicant: Palo Alto Research Center Incorporated, Palo Alto, CA (US)

(72) Inventors: Saroj Kumar Sahu, Fremont, CA (US); Francisco E. Torres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/863,948

(22) Filed: Apr. 16, 2013

(65) Prior Publication Data

US 2014/0305800 A1 Oct. 16, 2014

(51) Int. Cl.
*C02F 1/469* (2006.01)
*B01D 61/46* (2006.01)
*C02F 1/46* (2006.01)
*C02F 103/08* (2006.01)

(52) U.S. Cl.
CPC .............. *C02F 1/4693* (2013.01); *B01D 61/46* (2013.01); *C02F 1/4604* (2013.01); *C02F 1/4691* (2013.01); *C02F 1/4695* (2013.01); *C02F 2103/08* (2013.01)

(58) Field of Classification Search
CPC .... C02F 1/4604; C02F 1/4691; C02F 1/4695; B01D 61/46
USPC ................. 204/250, 251, 520, 522, 535, 539; 205/746, 748, 750
See application file for complete search history.

(56) References Cited

U.S. PATENT DOCUMENTS 2,799,638 A * 7/1957 Roberts ........................ 205/748
3,761,369 A * 9/1973 Tirrell ......................... 205/750
3,996,064 A 12/1976 Thaller
4,396,475 A * 8/1983 Stehík ........................... 205/748
8,889,281 B2 11/2014 La Mantia et al.

FOREIGN PATENT DOCUMENTS

EP 2 343 265 A1 7/2011

OTHER PUBLICATIONS

T. Xu, "Ion exchange membranes: state of their development and perspective," Journal of Membrane Science (2005), vol. 263, pp. 1-29.

(Continued)

*Primary Examiner* — Steven A. Friday
(74) *Attorney, Agent, or Firm* — The Marbury Law Group, PLLC

(57) ABSTRACT

There is disclosed an electrochemical cell for treating water comprising at least one water chamber configured to hold water to be treated; at least one redox electrode comprising reactants capable of accepting and having a reversible redox reaction with at least one negative ion in the water; at least one intercalation electrode capable of accommodating and intercalating at least one positive ion in the water, wherein the intercalation electrode is immersed in the water chamber or separated from the water chamber by an optional porous separator; and an anion exchange membrane separating the redox electrode from the water chamber. The cell can be used to desalinate water having a wide range of salinities, including sea water, and brackish water. The cell can also be used to collect salt, which can subsequently used to concentrate industrial brine. Methods for using the electrochemical cell to treat water, such as desalinate saline solutions are disclosed. Also disclosed are methods for concentrated brine production for making salt.

17 Claims, 4 Drawing Sheets

(56) References Cited

OTHER PUBLICATIONS

T. Brousse, P.-L. Taberna, O. Crosnier, R. Dugas, P. Guillemet, Y. Scudeller, Y. Zhou, F. Favier, D. Belanger, P. Simon, "Long-term cycling behavior of asymmetric activated carbon/MnO2 aqueous electrochemical supercapacitor," Journal of Power Sources (2007), vol. 173, p. 633-41.

S. Devaraj, N. Munichandraiah, "Effect of crystallographic Structure of MnO2 on its electrochemical capacitance properties," Journal of Physical Chemistry (2008), vol. 112, pp. 4406-4417.

D. Belanger, T. Brousse, J.W. Long, "Manganese oxides: battery materials make the leap to electrochemical capacitors," The Electrochemical Society Interface, (Spring 2008), pp. 49-52.

Q. Qu, L. Li, S. Tian, Wenling Guo, Yuping Wu, R. Holze, "A cheap asymmetric supercapacitor with high energy at high power: Activated carbon//K0.27Mn)2-0.6H2O," Journal of Power Sources (2010), vol. 195, pp. 2789-2794.

European Search Report for related application EP 14 16 3773, dated Sep. 4, 2014.

Pasta, M. et al., "A Desalination Battery," Nano Letters, ACS Publications, 2012, pp. 839-843.

* cited by examiner (α)

(β)

(γ)

(δ)

(λ)

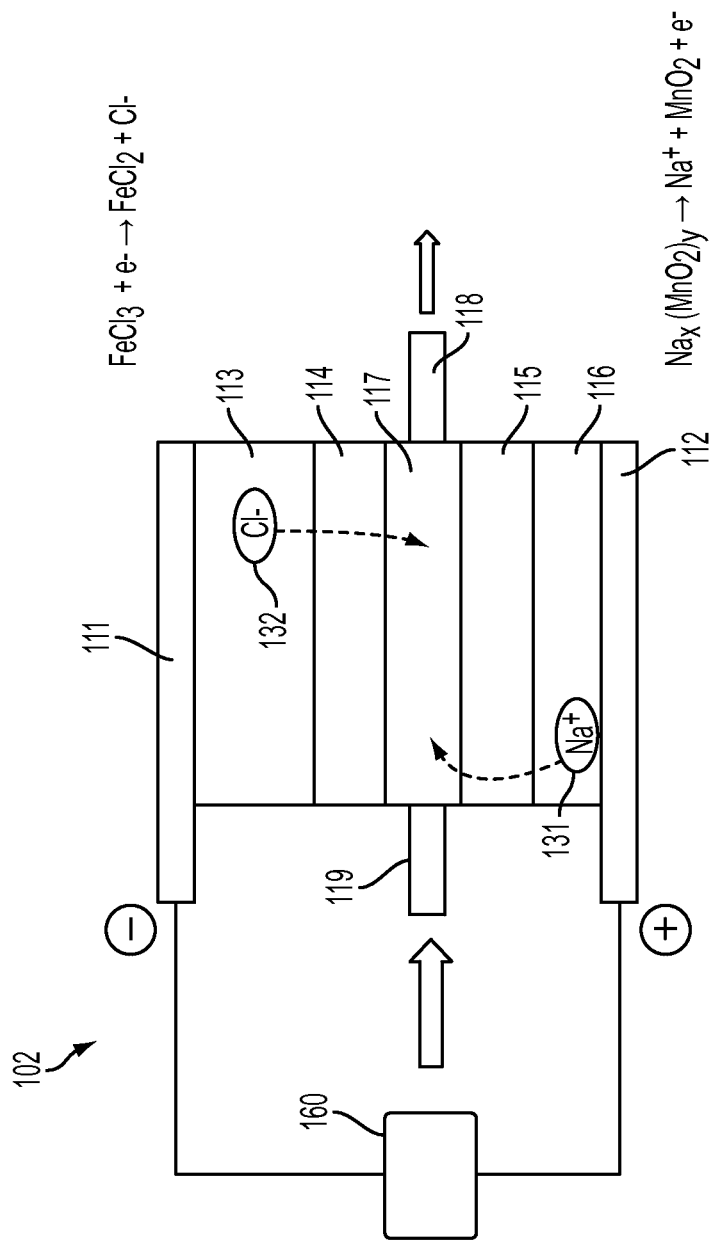

SEA WATER DESALINATION SYSTEM

TECHNICAL FIELD

The present disclosure relates generally to the field of salt water desalination, and more particularly to an electrochemical method for separating salts from sea water. This method is also relevant to the field of brine concentration and salt production.

BACKGROUND

Less than one percent of water on the earth's surface is suitable for direct consumption by human population and industries. Most of the surface fresh water is provided by rivers and lakes. Many places that do not have the geographic benefit of being close to such rivers and lakes suffer from a scarcity of fresh water. While transportation of fresh water from lakes and rivers through long pipelines, and drawing underground fresh water have been popular solutions, such resources are becoming scarcer as time goes by.

The salinity of water is usually represented by a total dissolved solid ("TDS") count, expressed in mg/L of salts dissolved. The salinity of sea water varies between 33,000 and 37,000 mg/L, and an average of 35,000 mg/L is accepted as the TDS count for sea water. Water with greater than 2,000-3,000 TDS is generally considered too salty to drink. Brackish water has no strict definition, and its salinity, depending on its location, may be between 2,000 and 35,000 TDS. Water having salinity in the range of 500 and 1,000 TDS is considered drinkable, but often has a strong taste. Most public water supplies in the world keep the TDS count below 500 for fresh water.

Sea water contains many species of salts. On average, out of 35,000 mg/L of TDS in sea water, sodium chloride contributes 30,000 mg/L, with the remaining 5,000 mg/L being primarily calcium, potassium, magnesium, and sulfate ions.

Obtaining fresh water by desalinating brackish and sea water has been an age-old practice. Thermal distillation was the earliest method used to desalinate sea water on a commercial basis, and improved distillation methods continue to be used today. The process involves distilling saline water and condensing the water vapor to obtain fresh water. While fresh water of great purity, for example below 25 TDS may be obtained with distillation, it remains an energy-intensive process due to the large specific heat and latent heat of vaporization of water. It is therefore commercially viable in places where plenty of waste heat is available, such as near power plants; where fresh water is scarce for natural reasons, such as arid coastal regions like the Persian Gulf; or where energy is available very inexpensively, such as in the Middle-East.

Modern technologies in thermal distillation include multistage flash ("MSF") and multi-effect distillation ("MED"). Because heat from the condensation of water vapor must be reutilized in order to make the distillation processes cost effective, thermo-mechanical arrangements are critical in such processes. Also, due to the thermal overhead, only very large distillation installations achieve good energy efficiency. In general, the energy consumption reaches 5-9 kWh/m$^3$ in large installations.

A reverse osmosis ("RO") process uses semi-permeable membranes and a driving hydraulic force of 150 to 1200 psi to remove dissolved solids from brackish or sea water. Under high pressure, water molecules move through the membrane whereas salt ions do so at a rate many orders of magnitude lower. Thus, the majority of dissolved salts are removed by the RO process. Generally, higher salinity requires higher pressures for desalination, and often, multiple pressure stages are employed to drive water through the RO membrane. RO is still an energy-intensive process, and typically, 3-10 kWh/m$^3$ of energy is required for sea water desalination using the RO process. Also, because the bulk of the water flows through the membrane, particulates and other impurities in the feed water can clog and foul the membrane unless the feed water is carefully pre-treated. Other problems with the RO process include its high installation and capital cost. In addition, because of the high driving pressure on the front side of an RO membrane, and the corresponding low back pressure, it is not uncommon that more than 70% of the feed water goes into the waste stream during the RO process.

Among modern desalination technologies, electrochemical methods have been employed. One such electrochemical method is electrodialysis ("ED"), which is a voltage-driven membrane process. An electric potential is used to move salts through a membrane, leaving fresh water behind as a product. ED takes advantage of the fact that most salts dissolved in water are ions, and are either positively charged or negatively charged. Because like charges repel each other and unlike charges attract, the ions will migrate toward electrodes having an opposite electric charge. Suitable membranes can be constructed to permit selective passage of either positive or negative ions. In a saline solution, dissolved ions such as positively-charged sodium and negatively-charged chloride migrate to opposite electrodes, passing through selected membranes that allow either cations or anions, but not both, to pass through. During the ED process, the salt content of the water channel is diluted, while concentrated solutions are formed at the electrodes. In an ED unit, membranes are usually arranged in an alternating pattern, with an anion-selective membrane followed by a cation-selective membrane. Concentrated and diluted solutions are created in the spaces between the alternating membranes, and the spaces bound by two membranes are called cells. Typical ED units consist of several hundred cells bound together with electrodes, and is referred to as a stack. Feed water passes through all of the cells simultaneously to provide a continuous flow of desalinated water and a steady stream of concentrate (brine) from the stack.

A variation of ED, called an electrodialysis reversal ("EDR") process operates on the same general principle as an ED unit, except that both the product and concentrate channels are identical in construction. At intervals of several times an hour, the polarity of the electrodes is reversed, causing ions to be attracted in the opposite direction across the membranes. Immediately following reversal, the product water is removed until the lines are flushed out and desired water quality restored. The flush takes just a few minutes before resuming water production. The reversal process is useful in breaking up and flushing out scales, slimes, and other deposits in the cells before their accumulation causes adverse effects. Flushing helps to reduce the problem of membrane fouling. Because the concentration gradient of the salts plays an important role in such a bipolar membrane structure, the voltage needed to maintain the gradient rises with the magnitude of the gradient. The voltage cannot be raised above the electrolytic decomposition voltage of water, which is about 1.3V, so the maximum salinity at which ED/EDR works is limited. As a result, this technology is normally used to desalinate brackish water, rather than high salinity water such as seawater.

Capacitive Deionization ("CD") is an electrosorption process whereby ions are removed from saline water using an electric field gradient as the driving force. The saline feed flows through electrodes comprised of materials such as carbon-based aerogels. These aerogels have very high surface areas, typically 400-1,000 $m^2/g$, which contributes to higher charge capacitance than a simple flat plate. A direct current is imparted, with a potential difference of 1-2 volts, and the cations are attracted to the anodic electrode, while the anions are attracted to the cathodic electrode. Ions are held at the surface of the electrode in an electric double layer. This technology can desalinate brackish water having an initial salinity of 2,000-4,000 TDS to below 500 TDS, thus making it drinkable. With good system design, typically, up to 70 percent of the stored charging energy can be recovered in the discharging process. As a result, the net energy consumption of CD is less than 0.5 $kWh/m^3$. However, water having salinities higher than about 4,000 TDS cannot be desalinated using this process, as the concentration gradient across the capacitive field would be too large to be separated with the application of the electrostatic force.

As described, different existing desalination technologies have various benefits and shortcomings. For example, CD and ED technologies, although energy efficient, and scalable to small units commercially, are not suitable for sea water desalination. RO and thermal distillation technologies such as MED and MSF can be used for sea water desalination, but are energy demanding and do not scale commercially. To avoid these and other deficiencies, there is disclosed a novel electrochemical desalination method that is highly efficient, highly scalable, and is effective for desalinating high salinity water such as sea water.

SUMMARY

It is an object of this disclosure to provide a method of electrochemical desalination with high energy efficiency and high scalability which work across a range of salinities, including high salinities such as sea water. It is also an object of this disclosure to provide a method of electrochemical desalination, which can be used to concentrate brine for other applications in a scalable and cost-effective way.

As a result, there is disclosed an electrochemical cell for treating water where the positive and negative salt ions are separated from the water volume; are either reduced or oxidized at respective electrodes; and remain physically dissolved, absorbed, adsorbed or intercalated as a result of application of an appropriate voltage. Also disclosed are methods for removing salts from water using such an electrochemical cell.

The accompanying figures, which are incorporated in and constitute a part of this specification, illustrate several exemplary embodiments of the disclosure and, together with the description, serve to explain the principles of the disclosure.

BRIEF DESCRIPTION OF THE DRAWINGS

FIG. 4 is a representation of the disclosed desalination device in a concentration (discharging) mode.

DETAILED DESCRIPTION

Definitions

Figure 1:
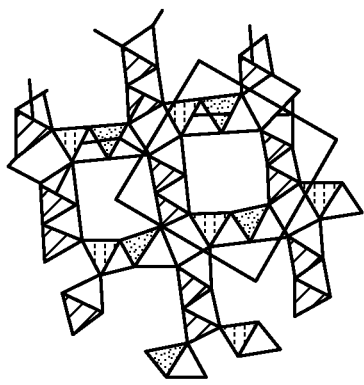
FIG. 1 is a schematic showing major crystalline structures of $MnO_2$.
Figure 1:
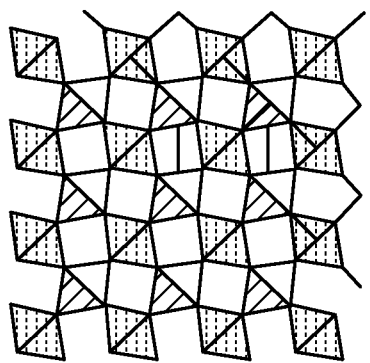
Figure 1:
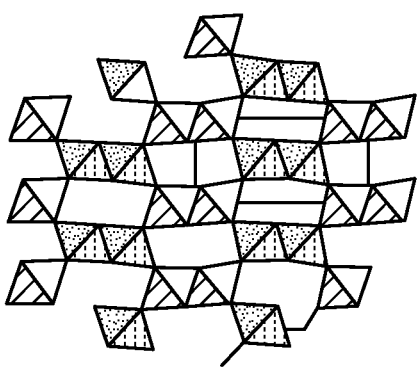
Figure 1:
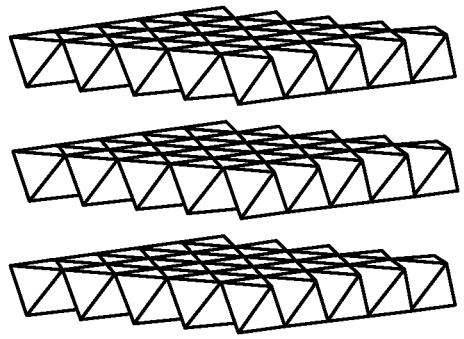
Figure 1:
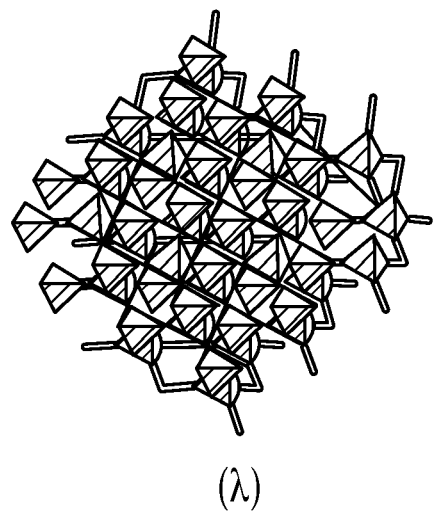

As used herein, "desalination" and variations thereof means the removal of individual ions, such as $Na^+$ and $Cl^-$ from an initial water source such that the salinity of desalinated water is less than the salinity of the initial water source.

As used herein, "resalination" and variations thereof means the addition of individual ions, such as $Na^+$ and $Cl^-$ to an initial water source such that the salinity of resalinated water is greater than the salinity of the initial water source.

As used herein, "electrochemical cell" and variations thereof means a device capable of facilitating chemical reactions through the introduction of electrical energy.

As used herein, "intercalation electrode" and variations thereof means an electro-active material that serves as a host solid into which guest ionic species are reversibly intercalated from an electrolyte. The intercalation electrode may expressly or inherently contain a conductive current collector that facilitates electron transfer.

As used herein, "redox electrode" and variations thereof means a volume of a salt solution that can change its state of oxidation as a result of the negative ion from the saline water entering this redox electrode volume. The redox electrode may expressly or inherently contain a conductive current collector that facilitates electron transfer.

The disclosure relates, in various exemplary embodiments, to methods for electrochemical desalination having high energy efficiency and high scalability, and which can be used to desalinate water having a varying degree of salinities, from a high salinity, such as sea water, to something less, such as brackish water.

There is disclosed an electrochemical cell for the treatment of water, such as for the desalination of water. In one embodiment, the electrochemical cell comprises at least one redox electrode comprising reactants capable of storing a negative ion with a reversible redox reaction among the reactants. Non-limiting examples of the redox electrode is one that comprises reactants capable of a ferrous-ferric redox reaction.

In one embodiment, the electrochemical cell comprises at least one crystalline intercalation electrode capable of accommodating a positive ion, such as an intercalation electrode comprising manganese dioxide. Manganese dioxide can assume several crystallographic forms, including α (alpha), β (beta), γ (gamma), δ (delta), and λ (lambda). As disclosed in Devaraj et al. ("Effect of Crystallographic Structure of $MnO_2$ on Its Electrochemical Capacitance Properties," J. Phys. Chem., (2008), 112, p. 4406-17), the entire contents of which are incorporated herein by reference, the alpha form includes one-dimensional tunnels, and the delta form is a two-dimensional layered compound. In one embodiment, the manganese dioxide has a crystallographic form that maximizes intercalations, such as an alpha or delta form.

In an aqueous medium, salts are usually dissociated into positive ions ("cations") and negative ions ("anions"). The ions may be selectively transported with the application of an appropriate electric field from one aqueous volume to another through an appropriate membrane. Under an electric field, the anions and cations will move in opposite directions, each toward an oppositely charged electrode. Membranes that selectively allow primarily anions to pass through, but block most of cation transport are called anionic ion exchange membranes ("AEM"). The electrochemical cell described herein further comprises an anion exchange membrane, having good chemical and mechanical stability, as well as low proton transport. In one embodiment, the anion exchange membrane is Fumasep® FAB (FuMA-Tech GmbH, Germany).

In one embodiment, the electrochemical cell comprises at least one water chamber configured to hold water to be treated, for example to be desalinated or resalinated. In various embodiments, such water to be desalinated comprises water having a salinity of at least 500 mg/L, such as a salinity ranging from 1000-35,000 mg/L. In another embodiment, the water to be resalinated comprises water having a salinity of less than 500 mg/L, such as a salinity of less than 100 mg/L or even less than 50 mg/L.

In one embodiment, the electrochemical cell further comprises a power supply capable of applying a voltage sufficient to make the redox electrode more positive than the intercalation electrode.

The electrochemical cell optionally comprises various outlets or chambers that can be utilized depending on the end-use. For example, the cell may comprise at least one outlet for the removal of treated water. The electrochemical cell may also comprise at least one chamber for the collection of salt.

There is also disclosed a method of desalinating water, that comprises flowing water having a salinity of at least 500 mg/L, such as a salinity ranging from 1,000-35,000 mg/L, through an electrochemical desalination cell comprising: at least one redox electrode comprising reactants capable of storing a negative ion with a reversible redox reaction among the reactants; at least one crystalline intercalation electrode capable of accommodating a positive ion; and an anion exchange membrane to produce a treated water having a salinity of less than 500 mg/L, such as a salinity of less than 250 mg/L, less than 100 mg/L, or less than 50 mg/L.

In one embodiment, the method utilizes various algorithms to control the flow of materials in and/or out of the cell. For example, the method may utilize an algorithm to fully or partially control the flow of the reactants or the water to be treated in and/or out of the cell.

In one embodiment, the method further comprises resalinating a previously desalinated system by connecting the redox electrode and the intercalation electrode to an electronic load. In this embodiment, the resalinating step supplies energy to the electronic load.

The method may also comprise applying a voltage with a power supply sufficient to make the redox electrode more positive than the intercalation electrode.

As previously mentioned, the present disclosure also provides an electrochemical desalination cell, and a method of using the same to concentrate brine for other applications in a scalable and cost-effective way. In this embodiment, the method further comprises collecting the salt removed by the desalination process, and adding the collected salt to industrial brine to increase its concentration.

The following provides a non-limiting, but more detailed explanation of the process and reaction schemes behind the present disclosure.

Redox Reaction at Redox Electrode:

The electrode reactions may be represented by Reaction Scheme 1, below:

Reaction Scheme 1

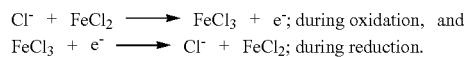

Cl⁻ + FeCl₂ ⟶ FeCl₃ + e⁻; during oxidation, and
FeCl₃ + e⁻ ⟶ Cl⁻ + FeCl₂; during reduction.

The chemical potential for Reaction Scheme 1 is about 0.7V.

The concentration of $FeCl_2$ ranges from about 0.1 M to about 1 M. The concentration of HCl ranges from about 0.1 M to about 3 M. In one exemplary embodiment, a 0.1 M $FeCl_2$ solution in 0.1 M HCl was used.

Sodium Intercalation in Manganese Dioxide Matrix:

Metals having water-reactive ions, such as $Na^+$, $Li^+$, $K^+$, $Mg^{2+}$, and $Ca^{2+}$ cannot be plated onto electrodes in aqueous solutions due to their high electrochemical potential. As a result, any attempt to plate these metals on a negative electrode in an electrochemical cell can result in a reaction with water and generation of hydrogen gas, rather than the metal plating. Therefore, removing such ions electrochemically from an aqueous solution cannot be done by plating. However, some of these Group I and II metal ions can be intercalated into a suitable transition metal compound, where they are insulated from the water. One such popular system is manganese dioxide ($MnO_2$). $Na^+$ and $K^+$ intercalation into $MnO_2$ has been shown. However, not every crystallographic form of $MnO_2$ can intercalate base metals very well. FIG. 1 is a schematic showing major crystalline structures of $MnO_2$. As shown in FIG. 1, the alpha and delta forms of $MnO_2$ are preferred in one embodiment of the present disclosure.

The general reaction for $Na^+$ intercalation into $MnO_2$ can be represented by Reaction Scheme 2, below:

Reaction Scheme 2

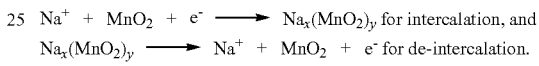

$Na^+$ + $MnO_2$ + $e^-$ ⟶ $Na_x(MnO_2)_y$ for intercalation, and
$Na_x(MnO_2)_y$ ⟶ $Na^+$ + $MnO_2$ + $e^-$ for de-intercalation.

Reaction Scheme 2 is pseudo-capacitive in nature, as it deals with fractional ionic charges. Furthermore, Reaction Scheme 2 does not have a purely Nernstian standard electrode potential.

Figure 2:
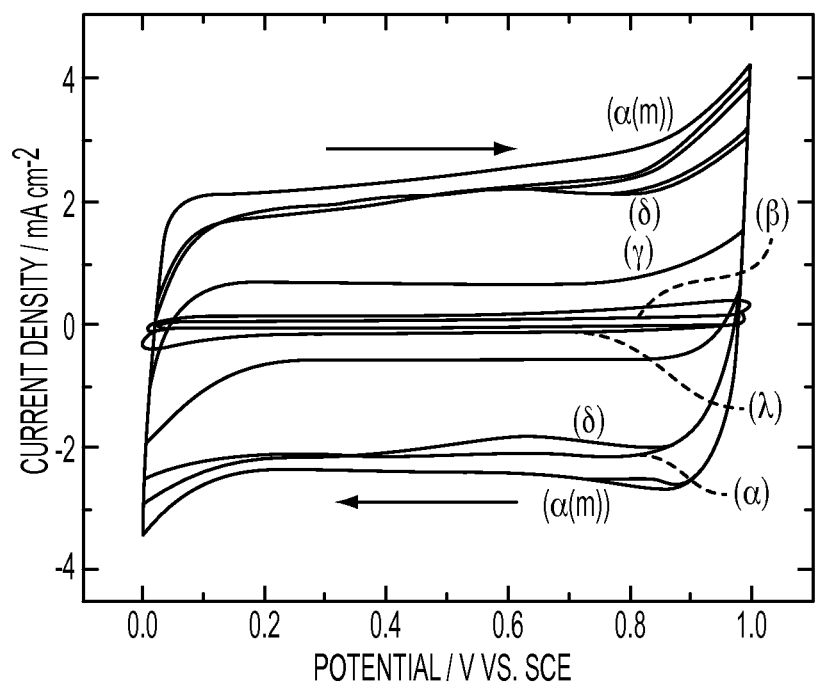
FIG. 2 is a cyclovoltammogram of Na—$MnO_2$ for various $MnO_2$ crystallographic forms.

FIG. 2 is a cyclovoltammogram of Na—$MnO_2$ for various $MnO_2$ crystallographic forms. Data points were recorded between 0 and 1.0 V vs. a reference electrode, the saturated calomel electrode (SCE), in aqueous 0.1 M $Na_2SO_4$ at a sweep rate of 20 mV/s. Most of the intercalation happens between 0.1V and 0.9V, as shown in FIG. 2.

It is generally accepted that $Na^+$ and $K^+$ can be reversibly intercalated and de-intercalated into and out of an appropriate $MnO_2$ matrix over a large number of cycles. This property is exploited in this disclosure. Although certain crystallographic forms of $MnO_2$ are disclosed herein, it is to be understood that other embodiments may use other crystals for $Na^+$ and $K^+$ intercalation. In fact, any crystalline compound that can host Na or K ions under an electrochemical potential by the virtue of intercalation is suitable for use in the disclosed method. For example, other potential crystals include, but are not limited to, $LiMnO_2$, iron phosphates, and intermetallic transition metal oxides.

The present disclosure is further illustrated by the following non-limiting examples, which are intended to be purely exemplary of the disclosure.

EXAMPLES

Example 1

Electrochemical Cell for Desalination

Ferrous-Ferric Chloride Redox Reaction:

A 0.1 M aqueous solution of ferrous chloride in 0.1 M HCl was oxidized to ferric chloride with a chloride ion (Cl⁻ diffused through a membrane under the influence of an electric potential. The ferric chloride was reduced to ferrous chloride solution in an energetically-favored way by giving up the Cl⁻ ion, which diffused through the membrane.

Anionic Ion Exchange Membrane:

An anion exchange membrane Fumasep® FAB (FuMA-Tech GmbH, Germany), which has an anionic selectivity of over 96%, has an electrical resistance of less than 1 $\Omega/cm^2$, is stable in pH ranges from 0-13, and is about 0.1 mm in thickness, was used.

Preparation of Alpha-$MnO_2$:

A laboratory scale amount of alpha form of $MnO_2$ ("Alpha-$MnO_2$") was prepared as follows. It is noted that high volume production of Alpha-$MnO_2$ can be accomplished using other industrial processes. 200 ml of 0.1 M $KMnO_4$ and 200 ml of 0.15M $MnSO_4.H_2O$ were prepared and individually heated to 30° C. The $KMnO_4$ solution was placed in a beaker and stirred in an ultrasonic bath. The $MnSO_4$ solution was added drop wise into the $KMnO_4$ solution. A brown precipitate appeared. The precipitation continued until all of the $MnSO_4$ solution was consumed. The beaker was taken out of the ultrasonic bath and was allowed to settle for 1 hour. The solution along with the precipitate was centrifuged at 9000 rpm for 2 minutes. After discarding the liquid, the precipitate was washed in deionized ("DI") water and centrifuged again at 9000 rpm for 2 minutes. The precipitate was retrieved and dried under vacuum at 80° C. for 2 hours. Finally the resulting dried precipitate powder was annealed in air at 200° C. for 12 hours.

Preparation of $MnO_2$ Electrode:

The Alpha-$MnO_2$ as prepared above (70 wt %) was mixed with acetylene black (20 wt %) and polyvinylidene fluoride ("PVDF") powder (10 wt %). A few drops of 1-methyl-2-pyrrolidinone was added as required to dissolve the PVDF powder, and the mixture was ground into a thick paste. The paste was applied onto a graphite sheet at a density of 0.1 $g/cm^2$ to form an electrode. The electrode was subsequently baked at a temperature of 130° C. under vacuum for 4 hours.

Figure 3:
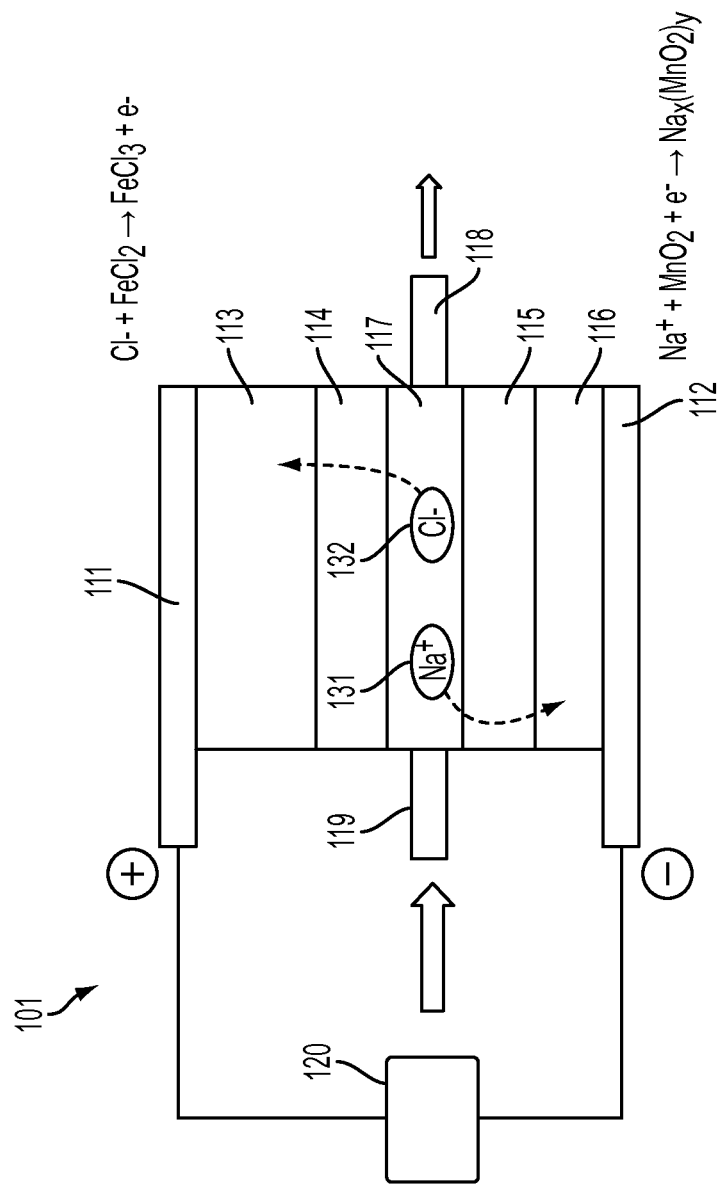
FIG. 3 is a representation of the disclosed desalination device in a desalination (charging) mode.

Assembly of Electrochemical Desalination Cell:

FIG. 3 is a representation of the disclosed desalination device in a desalination (charging) mode. As shown in FIG. 3, an electrochemical desalination cell was formed by a stack containing a first graphite plate electrode 111, a chamber 113 containing an iron electrolyte, an AEM 114, a main flow chamber 117, an optional porous membrane 115, and an $MnO_2$ layer 116 already mounted on a second graphite plate electrode 112. The chamber 117 had an inlet port 119 and an outlet port 118, through which saline water flowed as required.

The first electrode 111 was connected to the positive terminal and the second electrode 112 was connected to the negative of a power supply 120 during charging (desalinating).

The optional porous membrane 115 can prevent particulate matter in the flow stream from making contact with the $MnO_2$ layer 116, thus helping to prevent or reduce abrasive loss of the $MnO_2$ layer.

In an exemplary embodiment, the volume of iron electrolyte in chamber 113 was about 16 cc, and the liquid volume of the main flow chamber 117 was about 4 cc. The volume of iron electrolyte in chamber 113 ranged from about 5 cc to about 25 cc, and the liquid volume of the main flow chamber 117 ranged from about 1 cc to about 5 cc.

Experimental Result:

Solution A having a typical sea water composition and a salinity of 35,000 TDS was injected through the inlet port 119 to fill the chamber 117. A maximum of 1.8V was applied to the cell 101 with a maximum current setting of 250 mA. The cell current started at 250 mA and gradually dropped to 25 mA, at which point the charging was stopped. The solution in chamber 117 was removed through the outlet port 118 by a syringe and stored as solution B.

FIG. 4 is a representation of the disclosed desalination device in a concentration (discharging) mode. A fresh batch of solution A was injected into the chamber 117 through the inlet port 119, and the two terminals 111 and 112 were connected to an electronic load 160 as shown in FIG. 4. The discharge started at a current of 200 mA and was continued until the current and voltage dropped to 20 mA and 0.2V, respectively. The solution in chamber 117 was removed through the outlet port 118 by a syringe and stored as solution C.

The TDS values of solutions B and C were measured. Solution B had a TDS of 12,000, and solution C had a TDS of 56,000. Clearly, solution B had been desalinated and solution C had been resalinated. The discharge process as described in FIG. 4 gives the system an opportunity to recover much of the energy spent in the desalination process, thus greatly improving the system efficiency.

As shown in FIG. 3, upon application of the voltage on the cell from power supply 120, the $Cl^-$ ion 132 in the main chamber 117 moves through the AEM 114 into the iron electrolyte and converts $FeCl_2$ to $FeCl_3$. The $Fe^{2+}$ or $Fe^{3+}$ ions cannot move in the opposite direction due to the high selectivity of the AEM. At the same time, the $Na^+$ ion 131 in the main chamber 117 moves through the optional porous membrane 115 and intercalates into the $MnO_2$ layer 116. Removal of the individual ions $Na^+$ and $Cl^-$ constitutes the desalination process.

As shown in FIG. 4, upon releasing the voltage and providing an electron path in the form of the electronic load 160, the reverse redox reaction takes place. In the iron electrolyte chamber 113, the $Cl^-$ ion 132 is liberated due to the reduction of $FeCl_3$ to $FeCl_2$, and progresses through the AEM 114 into the main chamber 117. $Na^+$ ions from the chamber 117 are substantially not permitted to pass into the iron electrolyte due to the selectivity of the AEM 114. At the same time, the $Na^+$ ion 131 de-intercalates from the $MnO_2$ layer 116 and travels through the optional porous membrane 115 into the main chamber 117. Addition of the individual ions Na+ and Cl– constitutes the resalination process.

Other Embodiments:

The iron electrolyte will gradually be contaminated with NaCl and other salts from the saline water, as the AEM is not 100% selective. Also, iron molarities of different magnitudes may be required at different steps of the process. Therefore, making the iron electrolyte dynamic, for example by allowing the iron electrolyte to flow in and out of the system for treatment, reconditioning, or discarding, may result in an improvement of the conductance of the cell, due to replenishment of fresh electrolyte.

The main saline water electrolyte may flow as either a batch or as a continuous process which optimizes the desalination efficiency. In addition, the same process can be divided into several cells with different parameters that operate at different saline ranges so that the overall efficiency can be optimized.

At times the $MnO_2$ electrode may not be fully depolarized due to the lagging kinetics of de-intercalation. The system may be set up in such a way that the cell reverses its polarity for a known amount of time, keeping a tab on voltage and current, thus depolarizing and rejuvenating the $MnO_2$ matrix.

The system may be comprised of several cells, operating with automated intelligence so that while some cells are desalinating, some are resalinating and some are being depolarized. This electrochemical cell works well with high conductivity water, and therefore as the desalination proceeds, the cell current and efficiency decreases. At low salination levels, other technologies, such as capacitive and RO desalination may be more effective. It is therefore possible that the embodiments described herein can be used as an upstream desalination device to reduce the initial TDS to a lower value, at which point another technology can be used downstream so that the overall efficiency of the entire plant is optimized.

In a practical system, several cells may be put electrically in series and hydraulically in parallel to make an electrochemical stack to increase the material utilization. A stack may comprise of typically 1 to 100 cells.

As used herein, the terms "a", "an", and "the" are intended to encompass the plural as well as the singular. In other words, for ease of reference only, the terms "a" or "an" or "the" may be used herein, such as "a chamber", "an electrode", "the solution", etc., but are intended, unless explicitly indicated to the contrary, to mean "at least one," such as "at least one chamber", "at least one electrode", "the at least one solution", etc. This is true even if the term "at least one" is used in one instance, and "a" or "an" or "the" is used in another instance, e.g. in the same paragraph or section. Furthermore, as used herein, the phrase "at least one" means one or more, and thus includes individual components as well as mixtures/combinations.

The term "comprising" (and its grammatical variations) as used herein is used in the inclusive sense of "having" or "including," with which it may be used interchangeably. These terms are not to be construed as being used in the exclusive sense of "consisting only of" unless explicitly so stated.

Other than where expressly indicated, all numbers expressing quantities of ingredients and/or reaction conditions are to be understood as being modified in all instances by the term "about." This includes terms such as "all" or "none" and variants thereof. As used herein, the modifier "about" means within the limits that one of skill in the art would expect with regard to the particular quantity defined; this may be, for example, in various embodiments, ±10% of the indicated number, ±5% of the indicated number, ±2% of the indicated number, ±1% of the indicated number, ±0.5% of the indicated number, or ±0.1% of the indicated number.

Additionally, where ranges are given, it is understood that the endpoints of the range define additional embodiments, and that subranges including those not expressly recited are also intended to include additional embodiments.

As used herein, "formed from," "generated by," and variations thereof, mean obtained from chemical reaction of, wherein "chemical reaction," includes spontaneous chemical reactions and induced chemical reactions. As used herein, the phrases "formed from" and "generated by" are open ended and do not limit the components of the composition to those listed.

The compositions and methods according to the present disclosure can comprise, consist of, or consist essentially of the elements and limitations described herein, as well as any additional or optional ingredients, components, or limitations described herein or otherwise known in the art.

It should be understood that, unless explicitly stated otherwise, the steps of various methods described herein may be performed in any order, and not all steps must be performed, yet the methods are still intended to be within the scope of the disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An electrochemical cell for the treatment of water, comprising:
    at least one water chamber configured to hold water to be treated;
    at least one redox electrode comprising ferrous chloride solution in hydrochloric acid capable of accepting and having a reversible redox reaction with chloride ions in the water;
    at least one intercalation electrode capable of accommodating and intercalating at least one positive ion in the water, wherein the intercalation electrode is immersed in the water chamber or separated from the water chamber by an optional porous separator; and
    an anion exchange membrane separating the redox electrode from the water chamber.

2. The electrochemical cell of claim 1, wherein the intercalation electrode comprises manganese dioxide.

3. The electrochemical cell of claim 2, wherein said manganese dioxide is in alpha or delta crystallographic form.

4. The electrochemical cell of claim 1, further comprising a power supply capable of applying a voltage sufficient to make the redox electrode more positive than the intercalation electrode.

5. The electrochemical cell of claim 1, wherein said chamber configured to contain water to be treated comprises water having a salinity of at least 500 mg/L to be desalinated.

6. The electrochemical cell of claim 1, wherein said chamber configured to contain water to be treated comprises water having a salinity of at less than 500 mg/L to be resalinated.

7. The electrochemical cell of claim 1, further comprising at least one outlet for the removal of said treated water.

8. The electrochemical cell of claim 1, further comprising at least one chamber for the collection of salt.

9. A method of desalinating water, said method comprising flowing water having a salinity of at least 500 mg/L through an electrochemical desalination cell comprising:
    at least one water chamber configured to hold water to be treated;
    at least one redox electrode comprising reactants capable of accepting and having a reversible redox reaction with at least one negative ion in the water;
    at least one intercalation electrode capable of accommodating and intercalating at least one positive ion in the water, wherein the intercalation electrode is immersed in the water chamber or separated from the water chamber by an optional porous separator; and
    an anion exchange membrane separating the redox electrode from the water chamber,
    wherein said water exits said anion exchange membrane with a salinity of less than 500 mg/L;
    wherein the at least one redox electrode comprises ferrous chloride solution in hydrochloric acid;
    wherein the at least one negative ion in the water comprises chloride ions; and
    wherein the redox electrode comprising ferrous chloride solution in hydrochloric acid is capable of accepting and having a reversible redox reaction with chloride ions in the water.

10. The method of claim 9, further comprising controlling the flow of at least one of the reactants, the water to be desalinated, or the desalinated water, in and out of the cell according to an algorithm.

11. The method of claim 9, wherein said water that exits the anion exchange membrane has a salinity of ranging from 10-250 mg/L.

12. The method of claim 9, further comprising resalinating a previously desalinated water by connecting the redox electrode and the intercalation electrode to an electronic load.

13. The method of claim 12, wherein the resalinating supplies energy to the electronic load.

14. The method of claim 9, wherein the water to be desalinated has a salinity ranging from 1000-35,000 mg/L.

15. The method of claim 9, further comprising applying a voltage with a power supply sufficient to make the redox electrode more positive than the intercalation electrode.

16. The method of claim 9, further comprising collecting the salt removed by said desalination.

17. The method of claim 16, wherein the collected salt is subsequently added to industrial brine.

* * * * *